(12) United States Patent
Grafenhain et al.

(10) Patent No.: US 6,204,963 B1
(45) Date of Patent: Mar. 20, 2001

(54) RETROFITTABLE TUBULAR INTERMEDIARY ELEMENT

(75) Inventors: Paul Grafenhain, Heerbrugg; Ruedi Rottermann, Berneck, both of (CH)

(73) Assignee: Leica Microsystems AG (CH)

( * ) Notice: Subject to any disclaimer, the term of this patent is extended or adjusted under 35 U.S.C. 154(b) by 0 days.

(21) Appl. No.: 09/297,816

(22) PCT Filed: Nov. 11, 1997

(86) PCT No.: PCT/EP97/06295

§ 371 Date: May 14, 1999

§ 102(e) Date: May 14, 1999

(87) PCT Pub. No.: WO98/21616

PCT Pub. Date: May 22, 1998

(30) Foreign Application Priority Data

Nov. 12, 1996 (CH) .................................................. 2791/96

(51) Int. Cl.⁷ .................................................. G02B 21/00
(52) U.S. Cl. ........................... 359/384; 359/368; 359/379
(58) Field of Search ........................ 359/368, 374–376, 359/382–384, 407–420, 827–830

(56) References Cited

U.S. PATENT DOCUMENTS

| 4,175,826 | 11/1979 | Blaha et al. ........................ 359/384 |
| 4,299,439 | 11/1981 | Stromblad ............................ 359/384 |
| 4,576,450 | * 3/1986 | Westphal .............................. 359/384 |
| 4,798,451 | * 1/1989 | Fujiwara .............................. 359/384 |
| 5,177,636 | 1/1993 | Furuhashi ............................. 359/384 |
| 5,532,872 | 7/1996 | Sakamoto et al. .................... 359/384 |
| 5,589,977 | * 12/1996 | Lucke et al. .......................... 359/375 |
| 5,907,432 | * 5/1999 | Hayasaka ............................. 359/384 |

FOREIGN PATENT DOCUMENTS 1098233   1/1961  (DE).
3117254  11/1982  (DE).

* cited by examiner

*Primary Examiner*—Thong Nguyen
(74) *Attorney, Agent, or Firm*—Simpson, Simpson & Snyder, L.L.P.

(57) ABSTRACT

The invention relates to a tubular intermediary unit for a microscope comprising a relatively small upper part and a similarly small lower part, the upper part being pivotable about an axis of rotation relative to the lower part. Two deflecting mirrors are located in the observation beam path in the upper and lower parts. At least one of the deflecting mirrors can be pivoted, preferably about the same axis of rotation about which the upper part pivots, depending upon the tilt angle of the upper part relative to the lower part. The invention allows an observer to freely adjust an eyepiece tube carried by the upper part without changing the view on the field of vision under the microscope.

32 Claims, 6 Drawing Sheets

SECTION C-C

SECTION H-H

FIG. 10
SECTION E-E

FIG. 11
SECTION F-F

FIG. 12
SECTION G-G

FIG. 13

RETROFITTABLE TUBULAR INTERMEDIARY ELEMENT

CROSS-REFERENCE TO RELATED APPLICATIONS

The present application is the U.S. national phase under 35 U.S.C. 371 of International Application No. PCT/EP97/06295 filed Nov. 11, 1997 claiming priority of Swiss Patent Application No. 2791/96 filed Nov. 12, 1996.

BACKGROUND OF THE INVENTION

A. Field of the Invention

The invention concerns a retrofittable intermediate tube for a microscope, especially for a stereomicroscope.

Satisfactory observation with a microscope or stereomicroscope requires that the observer have the pupils of his eyes at the exit pupil of the eyepiece lens used. The optical axis leaving the instrument simultaneously forces a direction of view on him. Thus various observation situations (e. g., object dimensions, adapted equipment, nature of the system, and height of the table on which the microscope is placed) and anatomical details (body dimensions of the observer) lead to constrained sitting positions and body postures which do not always seem desirable from the ergonomic viewpoint. The invention concerns an intermediate tube which allows adjustment of the angle of the tube, relative to the vertical, so that an ergonomic tube adjustment can be found.

B. Description of the Related Art

"Ergotubes" with which the direction of view and/or the height of the eyepiece can be changed are known for microscopes with removable tubes. These ergotubes are generally relatively expensive, and also have the disadvantage that the fixed tube used previously, with its functional elements for producing a real intermediate image (tube lens, deflecting prism, perhaps also a beamsplitter) and for adjustment of the interpupillary distance become superfluous, as the known ergotubes include all those parts. Therefore they are not intermediate units but different and more ergonomic tubes which completely replace the non-ergonomic ones.

On the other hand, German Patent 7931427 (U.S. Pat. No. 4,299,439) describes an intermediate unit which can be inserted between the revolving objective nosepiece and the microscope tube. It can be used with the existing tube and can be used, particularly, to change the eyepiece height. This intermediate unit can be added to existing microscopes. As the goal of the problem on which the German Patent 7931427 (U.S. Pat. No. 4,299,439) was based was to provide an intermediate unit to adjust the eyepiece height, the change of the angle of view remains relatively slight with this known design. This intermediate unit has the disadvantage of requiring, because of its great length, an optical system to form an intermediate image. Aside from the added cost of the lens system, that can also cause vignetting or problems with definition. When this system is used for stereomicroscopes, the cost is obviously doubled because a second supplemental lens system must also be provided for the second beam path.

The voluminous structure and the severely off-centered weight distribution of the parts produce other disadvantages. The experts apparently followed the wrong path in considering the added intermediate image as desirable. The additional real intermediate image required by informed persons can, however, lead disadvantageously to a reduction of the contrast.

Furthermore, the image inversion described as advantageous is technologically superfluous, as most modern microscopes already provide image inversion at other, more suitable locations (e. g., in the binocular tube), so that use of the known intermediate unit returns to an inverted and reversed image.

Another known possibility for changing the eyepiece situation consists of use of a replaceable wedge-shaped intermediate tube unit, which generally contains a prism with two reflective surfaces. Such a system does, to be sure, require only a little mechanical cost, but it has the disadvantage that neither the eyepiece height nor the angle of view can be changed smoothly. The gain in comfort is, again, limited to just a single user or observer situation.

The ergotubes mentioned, as well as the known intermediate unit according to the German Patent 7931427 (U.S. Pat. No. 4,299,439) contain drives which assure that in case of a mechanical alteration of the angle of view by rotating the tube, the beam path is carried around a corresponding angle. Usually one reflecting surface (or more) (deflecting mirror) is tilted about its axis at half the angle through which the beam path is rotated by means of a reduction drive. It is preferred for the axis of rotation for the direction of view (for the tube) to coincide with the axis of rotation of the reflecting surface.

Known solutions for such angle-halving drives are, for example, multistage gear drives with a disadvantageous multiplicity of functional elements, or friction drives, which have a relatively great space requirement because of the necessary axial separation. All these drives have in common the fact that relatively high cost is needed to meet the functional requirements, such as accuracy of the reduction ratio, adequate freedom from play in the bearings, and ability to adjust the optical axis. That necessarily leads to high costs.

The binocular tube attachment described in German 1098233 C2 describes, for instance, a planetary gear drive with bevel gears to control a mirror when the angle of view is changed. Furthermore, a system for adjusting the interpupillary distance is recommended, which also provides for moving a mirror with an angle-halving drive which, in this case, is accomplished as a spatially acting lever drive. This principle is, to be sure, fundamentally suitable for moving a reflecting surface when the angle of view is changed; but the engineering accomplishment is made difficult by the fact that, for this particular application, a considerably larger range is desired for the angle being adjusted. Without additional measures to eliminate errors from play and tolerances in the individual parts, this known solution is therefore inadequate.

Flat lever drives which appear suitable for the invention are also described in German Patent 3117254 and Japanese Patent 4215419. See the contents of the two patents, and especially the corresponding figures with their descriptions. They are considered as disclosed with respect to this application. Cam drives, such as suggested in German Patent 2461044 B2 for a different application, are also conceivable. All these solutions have in common that a mirror can be moved with angular accuracy through the angle $\alpha/2$ only through precise construction and adjustment of the functional elements. That requires corresponding cost in production, and it is the intent of the invention to improve on that.

SUMMARY OF THE INVENTION

The goal of this invention is to provide a compact intermediate add-on tube unit which makes it possible to improve microscopes and stereomicroscopes having removable tubes with minimal cost, in such a manner that the direction of view (and thus, indirectly, the eyepiece height) can be changed smoothly, so that the disadvantages of designs previously used for this purpose are avoided.

The invention is based on the goal of providing a retro-fittable intermediate unit for a microscope tube, especially for a stereomicroscope, which is small, economically constructed, and offers a large range of angular adjustment.

This goal is attained as described in the present specification. The two flat connecting pieces, which are about the same size and relatively small, along with the deflecting mirrors which are close together, provide a very compact design which allows a large range of angular adjustment.

Special forms of the invention, and variants of it, are presented in the following description, and in the figures with their description.

Basic Design of an Intermediate Tube Unit According to this Invention

Figure 2:
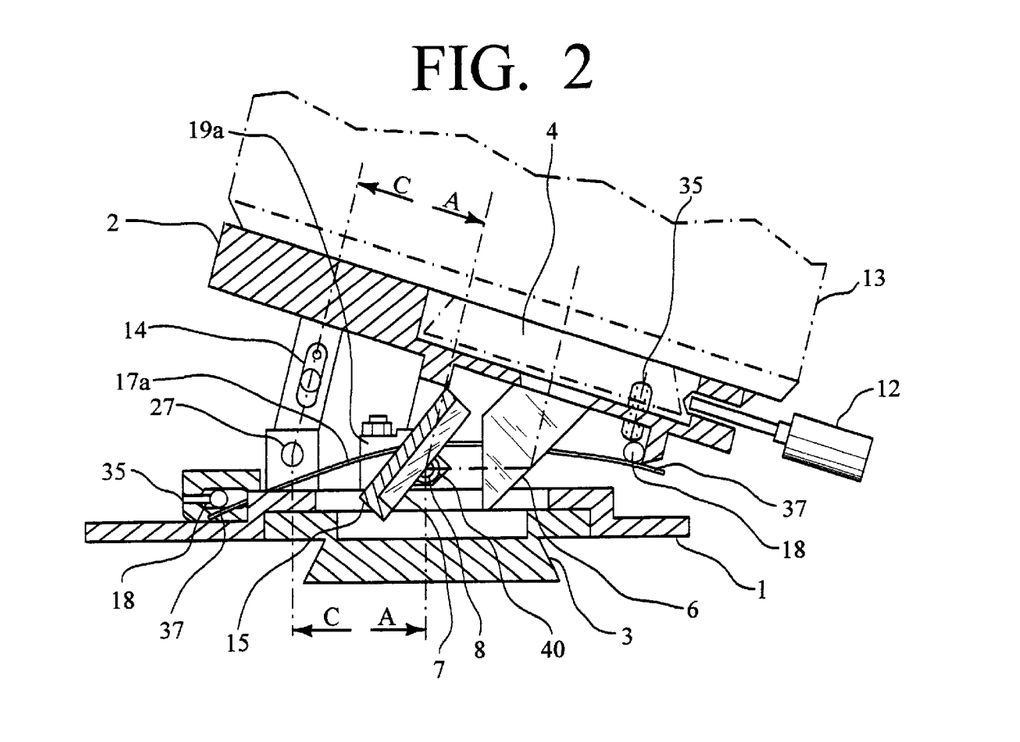
FIG. 2 another variant, in cross section, with a spring drive.

Basically, an even number of reflecting surfaces (preferably two) is required to maintain the upright and laterally correct intermediate image already produced by the microscope. For stereomicroscopes with two adjacent beam paths, it is convenient, for simpler adjustment, for these surfaces to cover both beam paths. The reflective coatings required for satisfactory reflection in some circumstances can be limited to the areas utilized by the beam paths. The upper part, with a tube connection for a standard tube, is mounted so that it can be rotated with respect to the lower part, which can be attached to the microscope, about an axis which is perpendicular to the optical axis. This axis of rotation preferably passes through the point of deflection of one of the two deflecting mirrors. Such an intermediate unit between the microscope and the tube increases the optical path of the beam, which is generally parallel at this point. This results in a danger of loss of brightness at the edge of the image, which may even amount to vignetting. That can be countered, if necessary, by equipping the intermediate unit with a convex, or positive, lens at the entrance and a concave, or negative, lens at the exit (FIG. 2).

The intermediate unit differs from that described in the German Patent 7931427 (parallel U.S. Pat. No. 4,299,439), however, in that no real intermediate image is produced, so that there is no image inversion. By the combination of the convex or positive lens and the concave or negative lens, though, the total magnification of the microscope can be changed, and the object field imaged can be reduced. That could be undesirable in many cases.

In a further improved and especially advantageous embodiment of this invention, that disadvantage is avoided by making the reflective surface of one of the two deflecting mirrors from a prism made of a material with high refractive index, so that the increase in the optical path length is held within acceptable limits and the additional lenses can be avoided.

It is particularly desirable if the prism is solidly mounted on the upper part which can be moved through an angle.

By moving the axis of rotation of the upper part into the reflective surface of the first deflecting mirror, or into that of the second deflecting mirror, the ratios of angular position to height position can be selected as desired. If the axis of rotation for the upper part and for the first deflecting mirror is in the first reflective surface, that gives the advantage, over the variation with the axis of rotation of the upper part and deflecting mirror in the second reflective surface, that a change of the angle of view is linked with a large change in the eyepiece height.

Angle-halving Spring Drive

Ordinary drives, such as those of the ergotubes mentioned, can be used as angle-halving drives; but two inventive new kinds of drives are described herein. They can be used independently of each other and also each can be used separately, independently of the inventive basic design presented above, in an independently inventive manner (e. g., in adjusting the interpupillary distances of the tubes of a stereomicroscope, or rotating an observation tube in a horizontal plane).

The spring mechanism described and protected in this invention has the advantage of having a small number of functional elements which can be produced simply. It comprises essentially of an upper part which is mounted on and can be rotated with respect to the lower part, and a mirror carrier with a mirror between them, mounted on a bearing so that it can move easily on the same axis. The rotational position of this mirror carrier is determined by the equilibrium between the torques $M_u$ and $M_o$ acting on a double-arm lever (which is comparable to a balance beam, but in this example embodiment is designed as a leaf spring) having one side $I_u$ and another side $I_o$. Here $I_u$ indicates the part of the balance beam, or the leaf spring, which attaches to the lower part, while $I_o$ stands for the part which attaches to the upper part. The torque $M_o$ arises from a prestressed spring element between the attachment point to the upper part and the mirror carrier and the corresponding lever arm at the point of rotation. The torque $M_u$ is generated in the same manner from the point of attachment to the lower part. An angular movement of the upper part by $\alpha$ causes a change in the torque $M_o$, so that the torques at the mirror carrier are unbalanced, and thus the mirror carrier necessarily moves until the equilibrium between $M_o$ and the opposing torques $M_u$ and $M_R$ is reestablished. Here $M_R$ stands for the frictional moment produced by friction in the bearings. This corresponds to a change in the rotational position of the mirror carrier, and of the rotatable mirror, by $\Delta\beta_o$ with respect to the upper part and by $\Delta\beta_u$ with respect to the lower part. The symmetrical arrangement of the individual elements and corresponding selection of the parameters, according to the invention, assures that the two characteristic lines $M_o(\beta_o)$ and $M_u(\beta_u)$ are identical to each other. The sufficiently easy movement of the mirror carrier ($M_R << M_o$, $M_u$) ensures that the difference between $\Delta\beta_u$ and $\Delta\beta_o$ remains negligibly small. Given that $\alpha = \Delta\beta_u + \Delta\beta_o$ and $\Delta\beta_u = \beta_o$, it follows that the mirror carrier moves by half the angle introduced at the upper part. The starting position and any residual asymmetries due to possible remaining errors can be adjusted by simple elements, at the two pivot points, for example.

The invention is not limited to the example of a symmetric leaf spring, that was presented here, to produce the system "double-arm lever with one spring element between the upper part and one between the lever and the lower part". Arrangements with tension, compression, or torque springs, which have characteristic torque curves which agree properly with respect to the mirror pivot point are equally the subject of this invention. That includes the fact that the adjustment points needed to compensate for residual errors can be at various locations. Furthermore, this invention, which is in itself independent, also covers other applications to microscopes in which something must be rotated by half the angle of a rotation. These could be, for instance, systems for adjusting interpupillary distance, or even optical indications from optical measuring instruments or the like.

This invention of a new kind of angle-halving drive extends substantially farther and can be used in quite varied technologies in mechanics and physics. The concept of the invention is, furthermore, not limited to angle-halving or to a reduction. Obviously, quite different reductions can be determined by varying the ratio of $I_u$ to $I_o$. If a torque is introduced between $I_u$ and $I_o$, conversely, the angle between the comparable upper and lower parts is increased.

Spatial Lever Drive for Angle Halving

According to this variant of the invention, a lever having its ends mounted, so that they can rotate, in the upper part and lower part, at least one of which can be moved in the direction of the axis of rotation, is used to move the deflecting mirror half as much as the mechanical alteration of the angle of view. As the relative rotation of the lever with respect to its mounting point is not about a defined axis, and the length of the lever, projected on the axis of rotation of the intermediate unit, is not constant, the lever ends are shaped so that the corresponding degrees of freedom are present, as in the form of spherical elements which are in contact with flat supporting surfaces on the upper and lower parts. This arrangement is practically insensitive to the effects of errors if the contact areas for the spherical segments are parallel to the axis of rotation between the upper and lower parts and the effective radii from the two ends of the lever to the axis of rotation are identical. As an alternative to the specified mounting of the lever, it can also be held so that both ends can move while its center is held fixed with respect to the axis of rotation. Variants with telescopic adjustment of the lever are also covered.

The mirror carrier, with the mirror, is moved by a caliper which attaches to at least one side of the lever at the center. This is preferably a fork-like element, and the same requirements for degrees of freedom apply to its contact point. According to the invention, a spherical segment was also selected for this particular embodiment, so that the lever, in principle, consists of three spherical segments on one axis. The design of the fork-like caliper surface at the mirror carrier, as a plane parallel to the axis of rotation, at a distance from the radius of the central spherical segment, makes the reduction ratio insensitive, according to the invention, to lateral displacements of the lever and to changes in the distance between the central spherical segment and the axis of rotation.

According to one particular embodiment using a spring, the contact between this caliper surface and the central spherical segment is maintained free of play. The fork can also be omitted if the spring is strong enough that it always pressed without play (even in case of vibrations) against the lever or the spherical segment, so as to prevent uncontrolled movement of the mirror.

Other spring elements can, if necessary, provide for freedom from play at the mounts at the ends of the lever.

If, according to one preferred embodiment, one of the spherical segments is flattened on one side and pressed with a compressive force by an approximately flat element (e. g., in the form of a leaf spring), then the lever is prevented from randomly rotating about its own axis and alignment errors among the three spherical segments cannot have harmful effects on the angle halving.

By making a contact surface for a spherical segment as a plane parallel to the axis of rotation at a distance from the spherical radius, this position can be used in a simple manner, as in the form of an axially adjustable cylindrical bolt perpendicular to this surface, to adjust the height of the exiting beam. To adjust the lateral direction it is sufficient for the angle of the common axis of rotation to tilt with respect to the optical axis, for example, as described above with a cylindrical bolt, or even with an adjustable element similar to a leaf spring, such that parallelism can be maintained by a spring element acting opposite to the adjustment movement.

BRIEF DESCRIPTION OF THE DRAWINGS

Other details of the invention can be found from the drawing. The same parts have the same reference numbers. Identical reference numbers with different indices refer to parts having the same function, with different structure or positions. The figures are described together and as a group. The reference number list provided is part of the description of the figures. The dimensions of the parts in the figures are approximately to scale, or they correspond to a preferred embodiment. However, the figures are shown only as forms of example embodiments and do not limit the invention. They show.

DETAILED DESCRIPTION OF THE PREFERRED EMBODIMENTS

Figure 1:
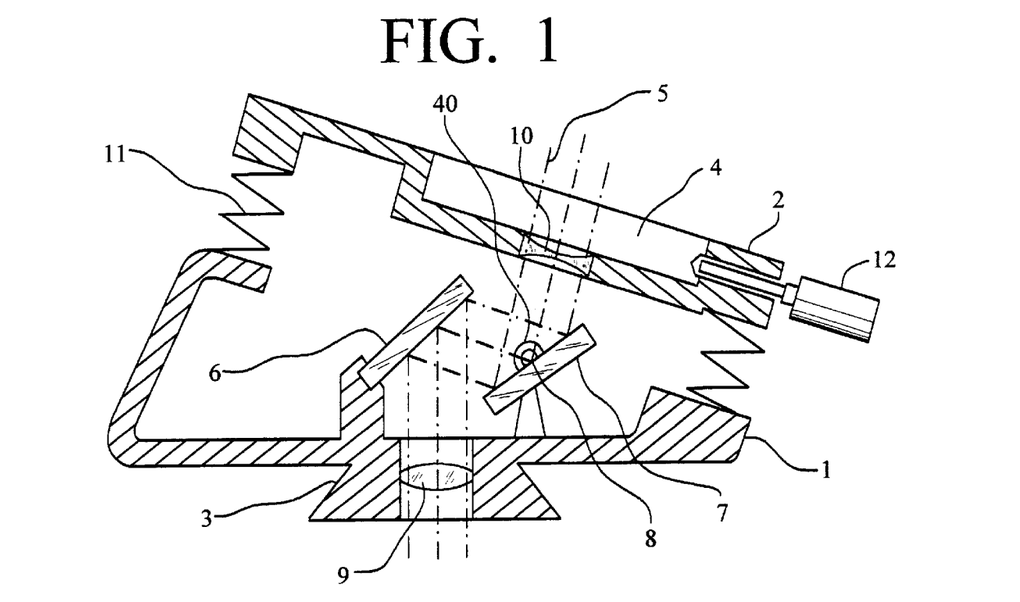
FIG. 1 a schematic, symbolic design of one variant of an intermediate unit according to the invention.
Figure 13:
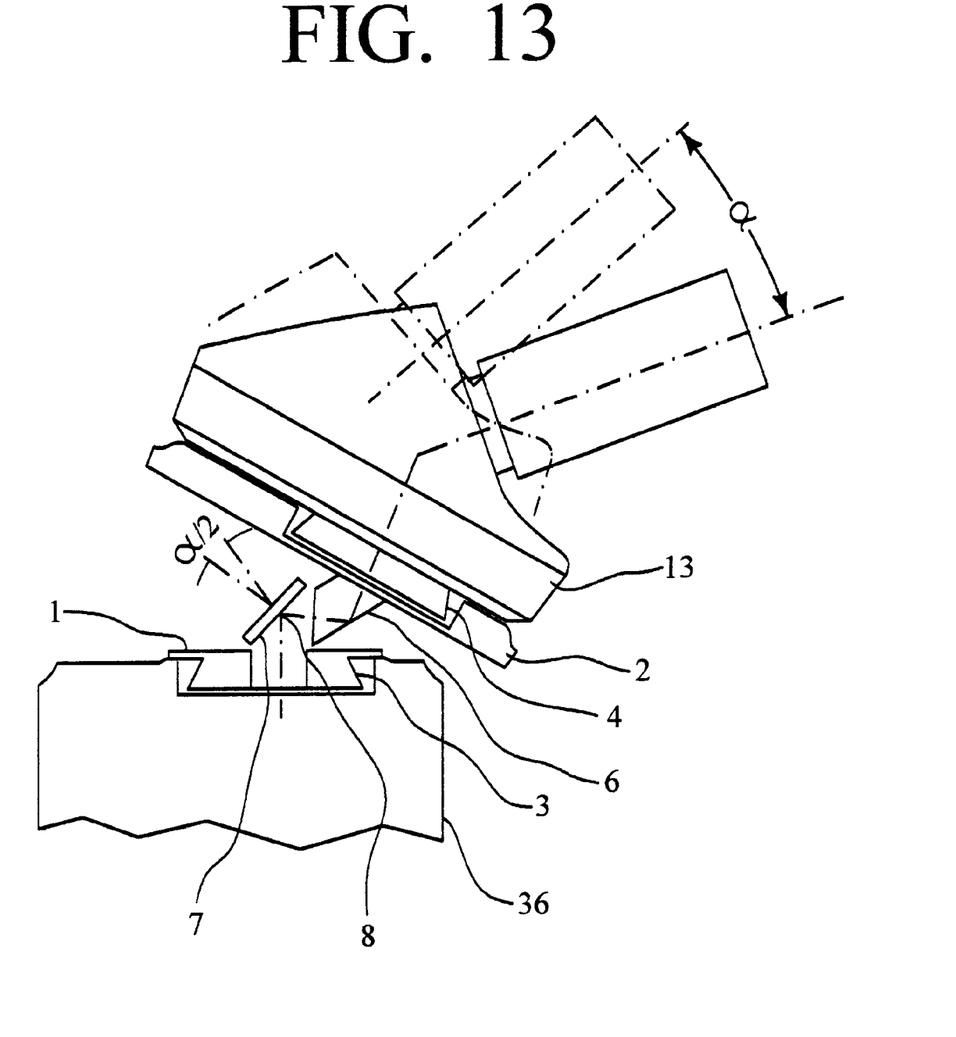
FIG. 13 a view of a microscope with the intermediate unit indicated.

The symbolic structure as shown in FIG. 1, and the depiction of a variant of such a structure in FIG. 13, clarify the core of the invention: a relatively small lower and upper part 1,2, the width of which does not differ significantly from the width of the microscope housing 36 or of the eyepiece tube 13, coupled with two deflecting mirrors 6 and 7, of which one 6 is firmly connected to part 1 (FIG. 1) or 2 (other figures), while the other is coupled, so that it can rotate, with the upper part 2 through an angle-halving drive (leaf spring) 17 (FIGS. 2–6) so that a rotational movement of the tube 13 maintains a suitable virtual beam path for an observer.

In the variant shown in FIG. 1, the mirror 6 is fastened to the lower part 1, while mirror 7 can rotate about an axis of rotation 8. For example. the mirror 7 can be supported for rotation by a low-friction bearing 40 such as a ball bearing or a roller bearing. In the variants in FIGS. 2 and 7, conversely, mirror 6—developed into a prism—is fixed to the upper part 2 and mirror holder 15 is rotatable supported by low-friction bearing 40. It is preferred for the axis of rotation for the direction of view (for the eyepiece tube) to coincide with the axis of rotation of the reflecting surface of mirror 7, and that this axis be substantially coplanar with the reflecting surface.

As the upper and lower parts 2,1 are close together according to the invention, the optical path inside the intermediate unit is short. It is further shortened in the variant of FIG. 1 by the concave lens 10 and the convex lens 9.

The eyepiece tube 13 can be connected to an upper mount 4, which matches the connection at the microscope housing 36, while a lower connection 3 matching the connection on the eyepiece tube 13 can be fastened to microscope housing 36 (FIG. 13).

The invention obviously includes variations in which both mirrors are rotated by one fourth the angular rotation of the tube 13, so that the virtual beam path is not affected by the rotational movement.

Figure 5:
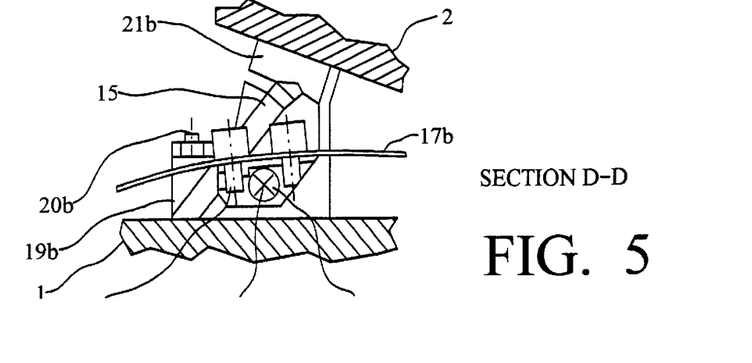
FIG. 5 a detailed cross section taken generally along the line D—D in FIG. 3.
Figure 6:
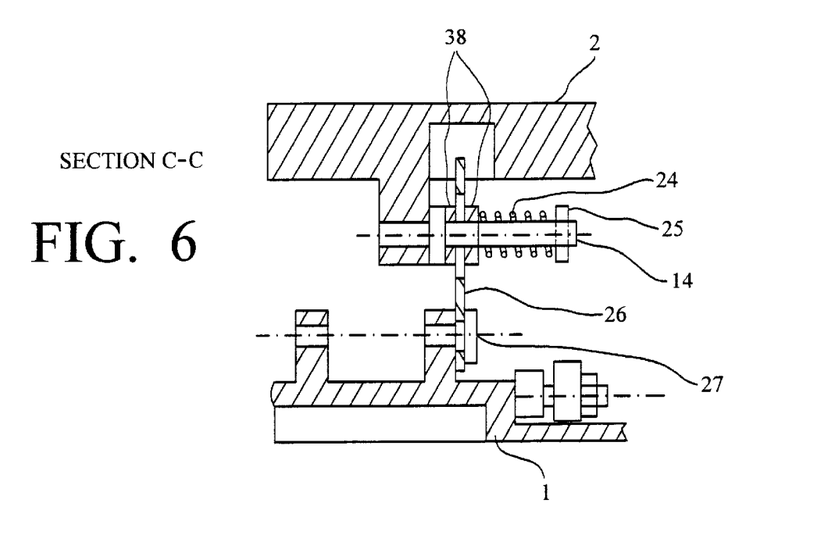
FIG. 6 a detailed cross-section taken generally along the line C—C in FIG. 2.

FIGS. 2–6 refer to a variant in which a new inventive design with at least one or more—parallel in the latter case—leaf springs 17a,b is realized as the angle-halving drive. The leaf springs are supported on the upper part 2 and on the lower part 1 by spring mounts 37, arranged symmetrically to the axis of rotation 8. At the center, i. e., in the vicinity of the axis of rotation 8, the leaf springs 17a,b are fastened to a mirror holder 15 by means of mounting screws 22 (FIG. 5).

Thus a rotational movement of the upper part 2 about the axis 8 causes the deflecting mirror 7 to rotate by half the angle of rotation. In this way, the beam path is coupled to the rotational movement. At the same time, the leaf springs 17a,b accept certain static and dynamic forces between the lower part 1 and the upper part 2. The spring mounts 37 can be adjusted in height or position by means of adjusting screw 35. and numeral 18 designates an adjustable holder for the spring mounts.

The axis of rotation 8 occurs physically in the axle stubs 23a,b, which at the same time are the pivots for the mirror holder 15. To make them free of play, they are connected to the lower part 1 through a pair of bearing blocks 19a,b with mounting springs 33d,c and mounting screws 20a,b.

A brake 14, which holds the rotational position of tube 13, once chosen, provides damped rotation and also provides frictional holding force.

The brake comprises, for instance, a prestressing adjustment 25 with a compression spring 24 and friction plates 38, pressed onto a connecting plate 26. The connecting plate 26 is held to the lower part 1, so that it can rotate, by a pivot 27.

Figure 3:
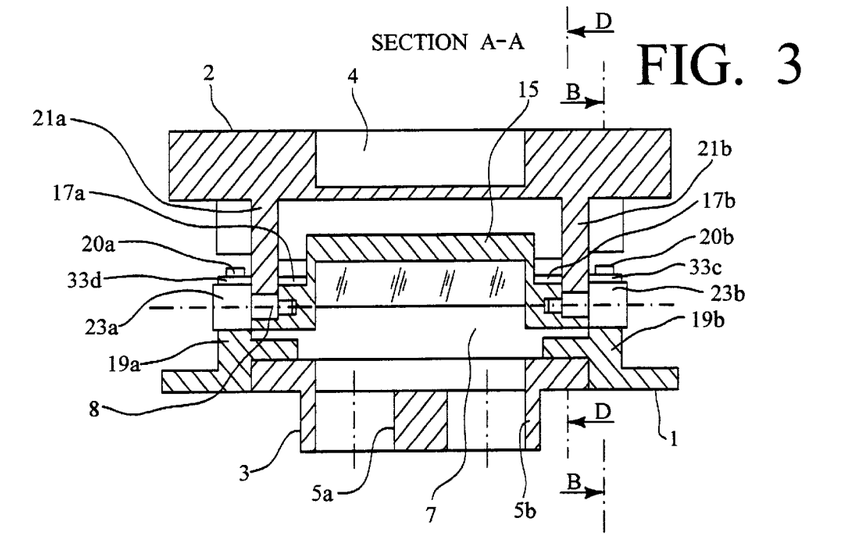
FIG. 3 a detailed cross section taken generally along the line A—A in FIG. 2.
Figure 4:
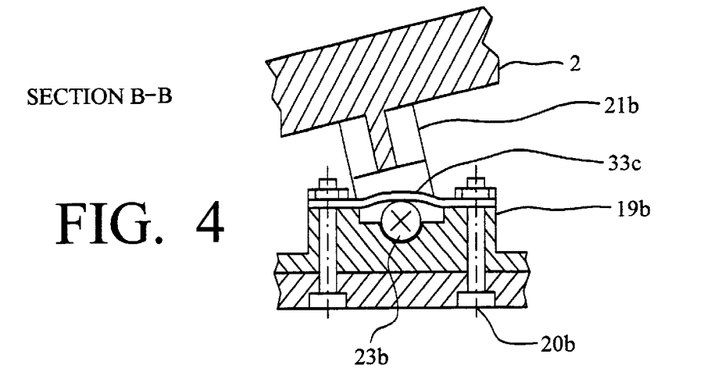
FIG. 4 a detailed cross section taken generally along the line B—B in FIG. 3.

FIG. 3 shows the two adjacent holes 5a and 5b which allow the binocular beam path of a stereomicroscope to pass through.

Figure 7:
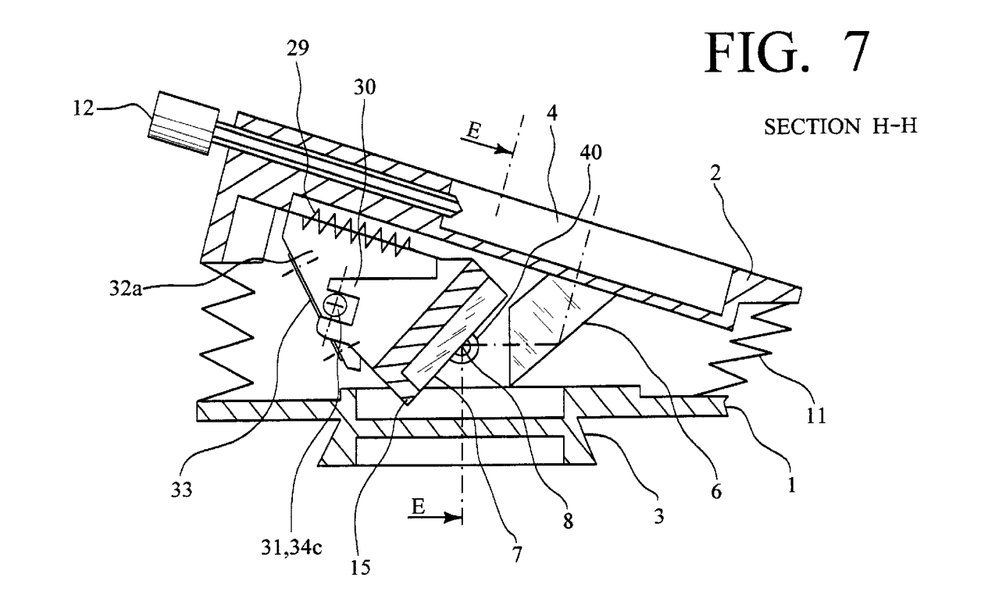
FIG. 7 a third variant, shown by cross section taken at plane H—H of FIG. 8, with a lever drive.
Figure 8:
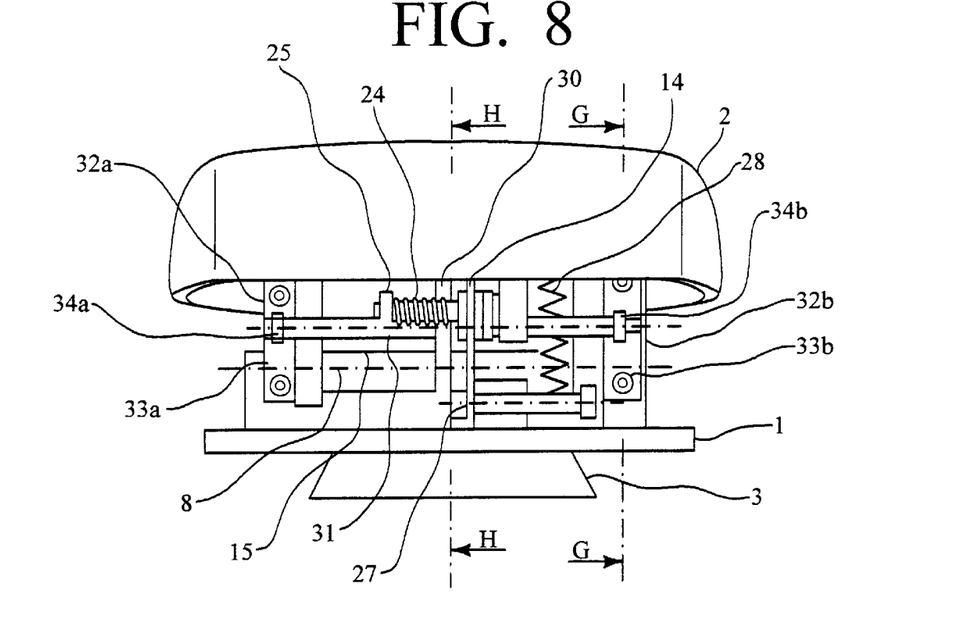
FIG. 8 a rear elevational view of the third variant.
Figure 11:
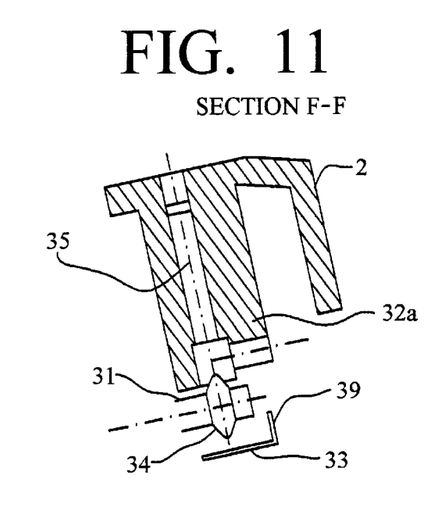
FIG. 11 a detailed cross section taken generally along the line F—F in FIG. 9.

The variant of FIG. 7 omits the leaf springs 17a,b as the angle-halving drive and inserts, instead, a lever 31, which has spherical segments 34a,b at both ends (FIG. 8, FIG. 11) and also has a spherical segment 34c at its center. At one end, lever 31 is mounted to upper part 2 by a lever mount 32a so that it can rotate slightly, while at an opposite end lever 31 is mounted to lower part 1 by a lever mount 32b so that it can rotate slightly. An upward rotation of the upper part 2 causes the center spherical segment 34c to rotate upward by half as much, with respect to lower part 1. As a fork-shaped caliper 30 which is firmly connected to the mirror holder 15 attaches to the middle spherical segment 34c, this causes mirror 7 to rotate by half the angle through which upper part 2 rotates.

An anti-play spring 29 with one end fastened to the mirror holder 15 and the other end fastened to the upper part 2 assures constant contact of the caliper 30 with the spherical segment 34c.

Adjusting screws 35 with axially movable bolts provide for adjustment of the height setting of the lever ends or spherical segments 34 by providing an adjustable contact surface. The supporting surface 16 at the lever bearing 32a of upper part 2 is designed so that when the distance between one lever end and the axis of rotation 8 is adjusted, the distance between the other lever and the axis of rotation 8 remains approximately the same.

Figure 9:
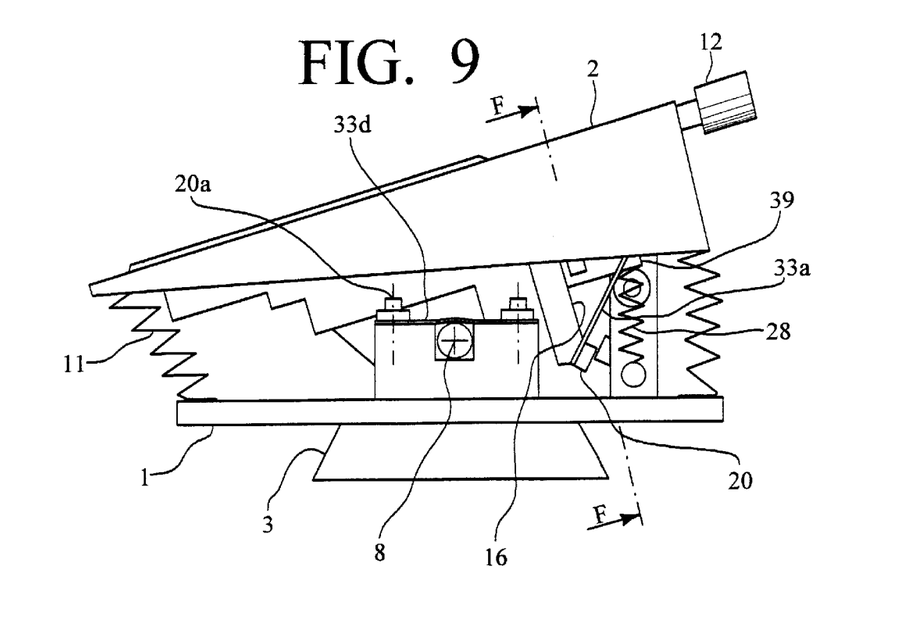
FIG. 9 a side elevational view of the third variant.
Figure 10:
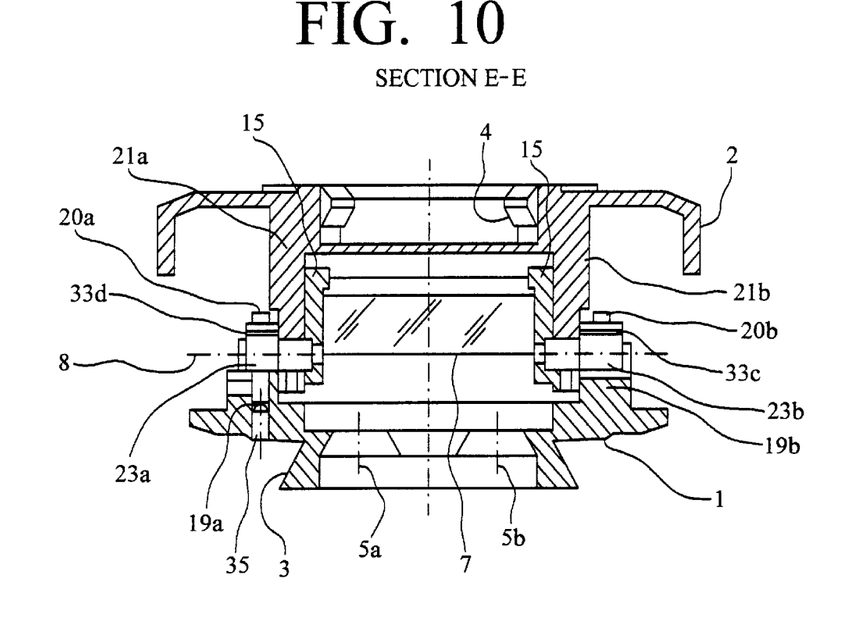
FIG. 10 a detailed cross section taken generally along the line E—E in FIG. 7.
Figure 12:
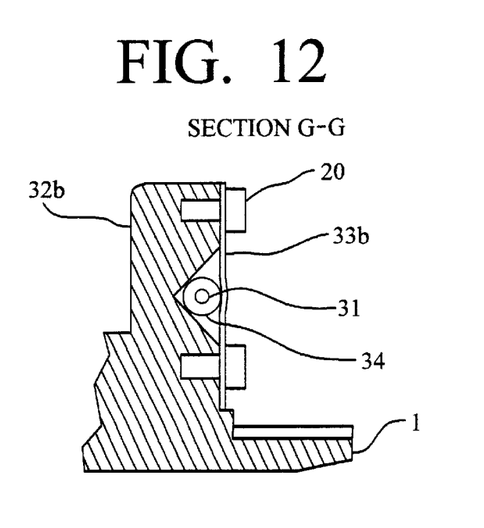
FIG. 12 a detailed cross section taken generally along the line G—G in FIG. 8.

Mounting springs 33a,b (FIG. 12) are mounted on the peripheral spherical segments 34a,b for play-free mounting. These mounting springs, of a special form, are provided with a limiting angular piece 39 at the center (FIG. 9) which limits the axial play of the lever 31 and, if necessary, axially prestresses the lever 31.

A weight-compensating spring 28 pre-loads the upper part 2 with respect to the lower part 1 so that the torque exerted by tube 13 is at least partially compensated—e.g., in its position as shown in FIG. 13.

A bellows 11 protects the internal mechanism and the deflecting mirrors 6,7 from dust and stray light.

LIST OF REFERENCE NUMBERS

1 Lower part
2 Upper part
3 Connection for microscope housing
4 Connection for tube
5 Beam path
5a,b Beam path holes
6 Deflecting mirror, fixed
7 Deflecting mirror, rotatable
8 Axis of rotation, main axis of rotation
9 Convex lens
10 Concave lens
11 Bellows
12 Locking screw
13 Tube
14 Brake
15 Mirror holder
16 Supporting surface
17a,b Leaf springs as angle-halving drive
18 Adjustable holder for spring mount
19a,b Bearing blocks
20a,b Mounting screws
21 Bearing bridge on the upper part
22 Mounting screw
23a,b Axle stubs
24 Compression spring
25 Prestressing adjustment
26 Connecting plate
27 Pivot point
28 Weight-compensating spring
29 Anti-play spring
30 Caliper
31 Drive lever
32a,b Lever bearings
33a–d Bearing mounting springs
34a,b Peripheral spherical segments on drive lever
34c Center spherical segment on drive lever
35 Adjusting screws
36 Microscope housing
37 Spring mount
38 Friction plates
39 Angular piece

What is claimed is:

1. An intermediate tube unit for selective removable mounting between a microscope body and an eyepiece tube for enabling angular adjustment of the eyepiece tube relative to the microscope body, said intermediate tube unit comprising:
    a beam path having an optical path length;
    a lower part including a beam entrance hole on said beam path, said lower part being adapted for removable mounting on said microscope body and having peripheral dimensions;
    an upper part pivotally coupled to said lower part for rotation about an essentially horizontal axis through an angular range, said upper part including a beam exit hole on said beam path and being adapted for removably mounting said eyepiece tube thereon;
    a positive lens placed at said beam entrance hole and a negative lens placed at said beam exit hole to reduce the optical path length of said beam path;
    first and second beam deflecting mirrors in said beam path between said beam entrance hole and said beam exit hole, said first and second beam deflecting mirrors being spaced close together without an optical element for image inversion therebetween; and
    a drive connecting said upper part to at least one of said first and second beam deflecting mirrors for rotating said at least one beam deflecting mirror at a reduced angle depending on the rotational movement of said upper part about said axis.

2. The intermediate tube unit according to claim 1, wherein one of said first and second deflecting mirrors is an internally reflective surface of a prism made of high-refractive index material.

3. The intermediate tube unit according to claim 2, wherein said prism is rigidly fixed to said upper part.

4. An intermediate tube unit for selective removable mounting between a microscope body and an eyepiece tube for enabling angular adjustment of the eyepiece tube relative to the microscope body, said intermediate tube unit comprising:
    a beam path;
    a lower part including a beam entrance hole on said beam path, said lower part being adapted for removable mounting on said microscope body and having peripheral dimensions;
    an upper part pivotally coupled to said lower part for rotation about an essentially horizontal axis through an angular range, said upper part including a beam exit hole on said beam path and being adapted for removably mounting said eyepiece tube thereon, said upper part having peripheral dimensions;
    first and second beam deflecting mirrors in said beam path between said beam entrance hole and said beam exit hole, said first and second beam deflecting mirrors being spaced close together without an optical element for image inversion therebetween, said axis of rotation of said upper part being substantially coplanar with a reflecting surface of one of said first and second beam deflecting mirrors; and
    a drive connecting said upper part to at least one of said first and second beam deflecting mirrors for rotating said at least one beam deflecting mirror at a reduced angle depending on the rotational movement of said upper part about said axis.

5. The intermediate tube unit according to claim 4, wherein said microscope body and said eyepiece tube include respective connection regions each having peripheral dimensions of approximately the same size for directly mounting said eyepiece tube on said microscope body, and said peripheral dimensions of said lower and upper parts are approximately the same as said peripheral dimensions of said connection regions.

6. The intermediate tube unit according to claim 4, wherein said space between said first and second deflecting mirrors does not contain any optical elements.

7. The intermediate tube unit according to claim 4, wherein one of said first and second deflecting mirrors is an internally reflective surface of a prism made of high-refractive index material.

8. The intermediate tube unit according to claim 7, wherein said prism is rigidly fixed to said upper part.

9. The intermediate tube unit according to claim 4, wherein said one of said first and second beam deflecting mirrors is rotated by said drive about an axis of rotation coincident with said axis of rotation of said upper part.

10. The intermediate tube unit according to claim 9, wherein said drive includes at least one lever arm having one end connected by spring force to said lower part, another end connected by spring force to said upper part, and a central portion operably connected to said at least one beam deflecting mirror at said axis of rotation.

11. The intermediate tube unit according to claim 10, wherein said at least one lever arm comprises a leaf spring extending approximately perpendicular to said axis of rotation.

12. The intermediate tube unit according to claim 11, wherein said at least one beam deflecting mirror is carried by a mirror holder and said central portion of said leaf spring is attached to said mirror holder.

13. The intermediate tube unit according to claim 12, wherein said mirror holder is supported by a low-friction bearing.

14. The intermediate tube unit according to claim 13, wherein said low-friction bearing is a ball bearing.

15. The intermediate tube unit according to claim 13, wherein said low-friction bearing is a roller bearing.

16. The intermediate tube unit according to claim 10, wherein said at least one mirror is supported by a low-friction bearing.

17. The intermediate tube unit according to claim 16, wherein said low-friction bearing is a ball bearing.

18. The intermediate tube unit according to claim 16, wherein said low-friction bearing is a roller bearing.

19. The intermediate tube unit according to claim 10, wherein said ends of said lever arm are connected to said lower part and said upper part by respective spring mounts.

20. The intermediate tube unit according to claim 19, wherein at least one of said spring mounts is supported by a low-friction bearing.

21. The intermediate tube unit according to claim 20, wherein said low-friction bearing is a ball bearing.

22. The intermediate tube unit according to claim 20, wherein said low-friction bearing is a roller bearing.

23. The intermediate tube unit according to claim 9, wherein said axis of rotation of said upper part and said one of said first and second beam deflecting mirrors is defined by a pair of axle stubs, and said pair of axle stubs are connected to said lower part by bearing blocks having respective mounting springs and mounting screws arranged for reducing rotational play.

24. The intermediate tube unit according to claim 4, wherein said tube unit includes a pair of said beam paths for use in a stereomicroscope.

25. The intermediate tube unit according to claim 24, wherein said first and second beam deflecting mirrors are wide enough to deflect both of said pair of said beam paths.

26. An intermediate tube unit for selective removable mounting between a microscope body and an eyepiece tube for enabling angular adjustment of the eyepiece tube relative to the microscope body, said intermediate tube unit comprising:
   a beam path;
   a lower part including a beam entrance hole on said beam path, said lower part being adapted for removable mounting on said microscope body;
   an upper part pivotally coupled to said lower part for rotation about an essentially horizontal axis through an angular range, said upper part including a beam exit hole on said beam path and being adapted for removably mounting said eyepiece tube thereon;
   a brake for selectively fixing the rotational position of said upper part relative to said lower part;
   first and second beam deflecting mirrors in said beam path between said beam entrance hole and said beam exit hole, said first and second beam deflecting mirrors being spaced close together without an optical element for image inversion therebetween; and
   a drive connecting said upper part to at least one of said first and second beam deflecting mirrors for rotating said at least one beam deflecting mirror at a reduced angle depending on the rotational movement of said upper part about said axis.

27. An intermediate tube unit for selective removable mounting between a microscope body and an eyepiece tube for enabling angular adjustment of the eyepiece tube relative to the microscope body, said intermediate tube unit comprising:
   a beam path;
   a lower part including a beam entrance hole on said beam path, said lower part being adapted for removable mounting on said microscope body;
   an upper part pivotally coupled to said lower part for rotation about an essentially horizontal axis through an angular range, said upper part including a beam exit hole on said beam path and being adapted for removably mounting said eyepiece tube thereon;
   a spring between said lower part and said upper part remotely of said axis of rotation for at least partially compensating weight of said eyepiece tube;
   first and second beam deflecting mirrors in said beam path between said beam entrance hole and said beam exit hole, said first and second beam deflecting mirrors being spaced close together without an optical element for image inversion therebetween; and
   a drive connecting said upper part to at least one of said first and second beam deflecting mirrors for rotating said at least one beam deflecting mirror at a reduced angle depending on the rotational movement of said upper part about said axis.

28. An intermediate tube unit for selective removable mounting between a microscope body and an eyepiece tube for enabling angular adjustment of the eyepiece tube relative to the microscope body, said intermediate tube unit comprising:
   a beam path;
   a lower part including a beam entrance hole on said beam path, said lower part being adapted for removable mounting on said microscope body;
   an upper part pivotally coupled to said lower part for rotation about an essentially horizontal axis through an angular range, said upper part including a beam exit hole on said beam path and being adapted for removably mounting said eyepiece tube thereon;
   first and second beam deflecting mirrors in said beam path between said beam entrance hole and said beam exit hole, said first and second beam deflecting mirrors being spaced close together without an optical element for image inversion therebetween; and
   a drive connecting said upper part to at least one of said first and second beam deflecting mirrors for rotating said at least one beam deflecting mirror at a reduced angle depending on the rotational movement of said upper part about said axis, wherein said drive includes an elongated drive lever and an angle caliper, said drive lever having one end mounted on said lower part and another end mounted on said upper part such that said drive lever is substantially parallel to said axis of rotation when said upper part is at an intermediate angular position in said angular range, said drive lever further having a spherical segment at its mechanically effective center, and said angle caliper is operatively connected to said spherical segment and said at least one beam deflecting mirror to rotate said at least one beam deflecting mirror depending on rotational movement of said upper part about said axis.

29. The intermediate tube unit according to claim 28, wherein said drive further includes a rotational lock for preventing accidental rotation of said drive lever about its own axis.

30. The intermediate tube unit according to claim 28, wherein said drive further includes an anti-play spring for maintaining constant contact between said angle caliper and said spherical segment.

31. The intermediate tube unit according to claim 28, wherein said one end and said another end of said drive lever include respective peripheral spherical segments, and said drive further includes a pair of mounting springs respectively associated with said peripheral spherical segments for reducing play in said drive lever.

32. The intermediate tube unit according to claim 31, wherein said pair of mounting springs include an angular piece for limiting axial play of said drive lever.

* * * * *